United States Patent [19]

Kwon

[11] Patent Number: 5,729,297
[45] Date of Patent: Mar. 17, 1998

[54] SCANNING LINE INTERPOLATOR USING GAMMA CORRECTION MEMORY

[75] Inventor: Byong Hwun Kwon, Seoul, Rep. of Korea

[73] Assignee: LG Electronics Inc., Seoul, Rep. of Korea

[21] Appl. No.: 564,678

[22] Filed: Dec. 1, 1995

[30] Foreign Application Priority Data

Dec. 8, 1994 [KR] Rep. of Korea ............ 33322/1994

[51] Int. Cl.$^6$ ............................................. H04N 5/202
[52] U.S. Cl. ................................. 348/458; 348/674
[58] Field of Search .......................... 348/458, 441, 348/254, 674–677, 443, 448; 358/164; H04N 5/202, 5/20, 9/69, 5/208

[56] References Cited

U.S. PATENT DOCUMENTS

| 4,903,122 | 2/1990 | Ozaki et al. | 348/237 |
|---|---|---|---|
| 5,089,890 | 2/1992 | Takayama | 348/674 |
| 5,361,094 | 11/1994 | Jang | 348/674 |
| 5,374,953 | 12/1994 | Sasaki et al. | 348/65 |
| 5,517,248 | 5/1996 | Isoda | 348/459 |
| 5,534,948 | 7/1996 | Baldwin | 348/675 |
| 5,625,379 | 4/1997 | Reinert et al. | 345/154 |

FOREIGN PATENT DOCUMENTS

| 2-230873 A | 9/1990 | Japan | H04N 5/202 |
|---|---|---|---|
| 6-276541 A | 9/1994 | Japan | H04N 9/69 |
| 6303633 A | 10/1994 | Japan | H04N 9/69 |

Primary Examiner—Tommy P. Chin
Assistant Examiner—Y. Lee
Attorney, Agent, or Firm—John P. White

[57] ABSTRACT

A scanning line interpolator using a gamma correction memory includes a controller for outputting switching control signals according to an input video signal; an analog/digital converter for converting the input video signal into a digital signal; a first multiplexer for allowing the output signal of the analog/digital converter to pass according to the switching control signal output from the controller; a line buffer having a 1H delay for delaying the digital video signal having passed through the first multiplexer; a gamma correction memory for previously storing the scanning line interpolated digital video signal and then outputting it with the output signals of the analog/digital converter and 1H delay being taken as its addresses; and a second multiplexer for selectively outputting the output signals of the analog/digital converter and gamma correction memory according to the switching control signal output from the controller.

2 Claims, 7 Drawing Sheets

| address | data |
|---------|------|
| 'h0000 | 'hFF |
| 'h0001 | 'hFE |
| 'h0002 | 'hFE |
| ... | ... |
| 'h0804 | 'hF7 |
| 'h0805 | 'hF6 |
| 'h0900 | 'hF8 |
| 'h0901 | 'hF8 |

| address | digital video signal |
|---|---|
| 'h 0000 | h'00 |
| 'h 0001 | h'01 |
| 'h 0002 | h'01 |
| 'h 0003 | h'02 |
| ⋮ | ⋮ |
| 'h 0004 | h'06 |
| 'h 0005 | 'h 07 |
| ⋮ | ⋮ |
| 'h 0900 | 'h 05 |
| 'h 0901 | 'h 05 |
| ⋮ | ⋮ |

SCANNING LINE INTERPOLATOR USING GAMMA CORRECTION MEMORY

BACKGROUND OF THE INVENTION

The present invention relates to a scanning line interpolator using a gamma correction memory for interpolating a video signal of high resolution in a liquid crystal display (LCD) projector or digital television, and more particularly, to a scanning line interpolator using a gamma correction memory which is suitable in interpolating a video signal of high resolution with a clock of low frequency.

Figure 1:
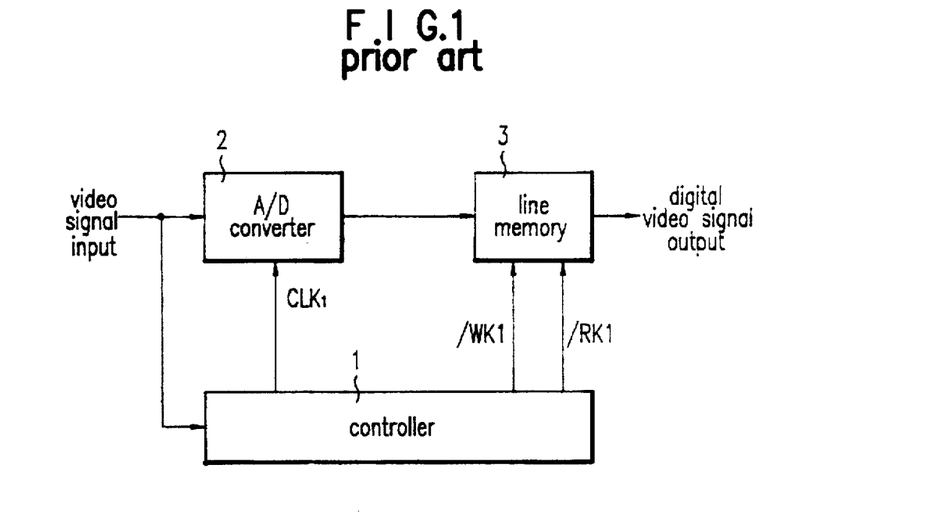
FIG. 1 is a block diagram of a conventional scanning line interpolator.

A conventional scanning line interpolator, as shown in FIG. 1, consists of a controller 1 for generating a digital conversion clock signal $CLK_1$, write clock signal/$WK_1$, and read clock signal/$RK_1$ according to an input video signal, an analog/digital converter 2 for converting the input video signal into a digital signal according to digital conversion clock signal $CLK_1$, and a line memory 3 for storing the output signal of analog/digital converter 2 according to write clock signal/$WK_1$ and outputting it according to read clock signal /$RK_1$.

In such a scanning line interpolator formed as above, controller 1 generates digital conversion clock signal $CLK_1$, write clock signal/$WK_1$, and read clock signal/$RK_1$ according to the input video signal, and applies them to analog/digital converter 2 and line memory 3.

Analog/digital converter 2 converts the input video signal into a digital signal according to digital conversion clock signal $CLK_1$. The digitally converted signal is applied to line memory 2, and stored therein according to write clock signal/$WK_1$. The stored signal is read out according to read clock signal/$RK_1$.

The scanning line interpolator performs interpolation by repeatedly outputting lines with the frequency of read clock signal/$RK_1$ being twice the frequency of write clock signal $WK_1$. In order to interpolate a signal of high resolution, this circuit requires a clock (above 50 MHz) hard to process.

Figure 2:
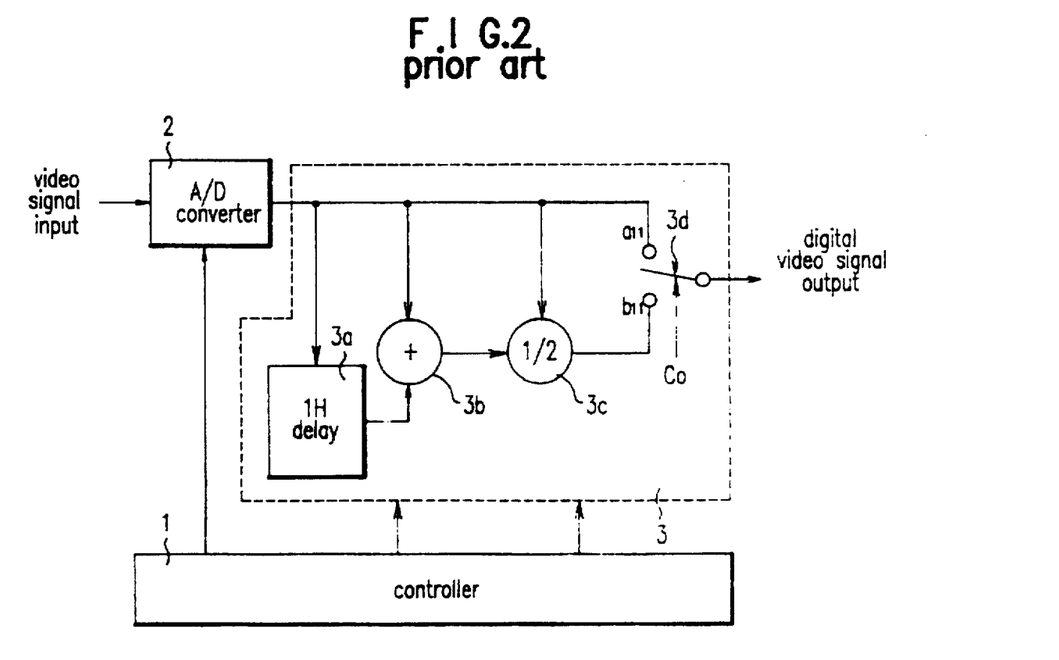
FIG. 2 is a detailed circuit diagram of FIG. 1.

Referring to FIG. 2, more specifically, the scanning line interpolator includes analog/digital converter 2 for converting an input video signal into a digital signal, a 1H delay 3a for delaying the output signal of analog/digital converter 2 by one H (H means 1H scanning period or 1H line period), a summer 3b for summing the output signals of analog/digital converter 2 and 1H delay 3a, a ½-fold multiplier 3c for multiplying the output signal of summer 3b by half, and a multiplexer 3d for selectively outputting the output signals of analog/digital converter 2 and ½-fold multiplier 3c according to a control signal $C_O$ input according to sequential scanning or interlace scanning. The operation of the conventional scanning line interpolator will be discussed below.

The input video signal converted into a digital signal in analog/digital converter 2 is applied to summer 3b and multiplexer 3d via one fixed port $a_{11}$, and input to 1H delay 3a, which then delays the output signal of analog/digital converter 2 by one H. Here, the output signal of 1H delay 3a is input to summer 3b to be added to the output signal of analog/digital converter 2. The summed signal is amplified by half in ½-fold multiplier 3c and applied to the other fixed port $b_{11}$ of multiplexer 3d.

Multiplexer 3d selectively outputs the output signals of analog/digital converter 2 and ½-fold multiplier 3c according to input control signal $C_O$ in order to perform interpolation of scanning line. In order to convert an interlace scanning signal to a sequential scanning signal, the multiplexer selectively outputs the interpolated output signal of ½-fold multiplier 3c. Its original signal selectively outputs the output signal of analog/digital converter 2.

Here, summer 3b and ½-fold multiplier 3c requires respective clock signals to be processed at high speed for summation and multiplication of digital video signal. For this, a clock signal having four times the frequency of a main clock applied to analog/digital converter 2 as a sampling signal must be used. In case the input video signal is in a general NTSC mode and lower than the frequency of the main clock, it can be easily processed.

However, in case of a video signal of VGA (video graphics array adapter), XGA or EWS (engineering work station) which has a main clock signal of high frequency, the video signal is very difficult to process.

Several problems of the conventional technology will be presented below in detail.

Figure 3A:
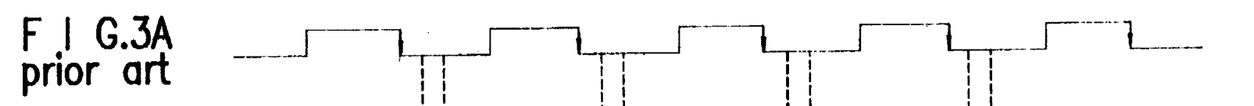
FIGS. 3A–3G are diagrams of operation waveforms for the respective portions of FIG. 2.
Figure 3B:
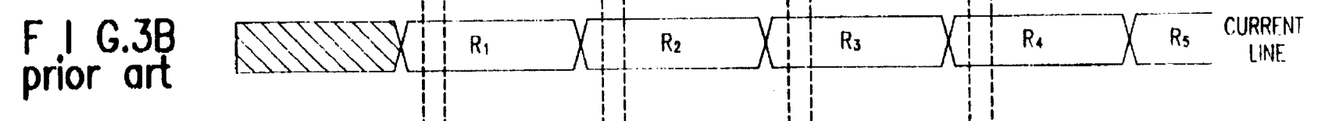
Figure 3C:
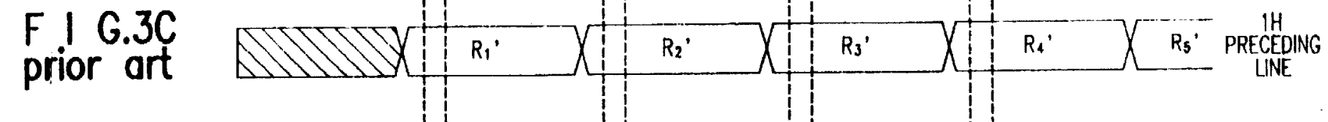

First, when a clock signal of FIG. 3A is applied to analog/digital converter 2, this circuit converts a video signal into a digital signal as shown in FIG. 3B. The output digital video signal is delayed by one H in 1H delay 3a of line memory 3 as shown in FIG. 3C.

Figure 3D:
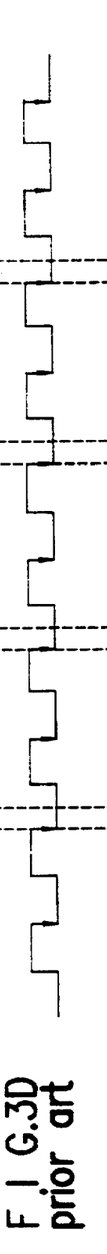
Figure 3E:
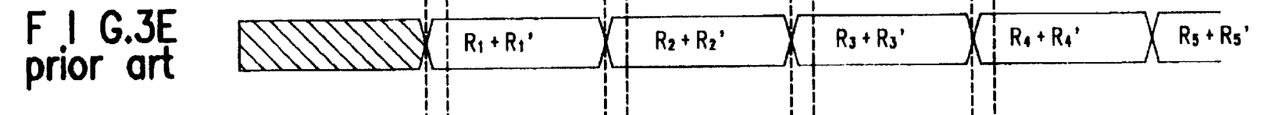
Figure 3F:
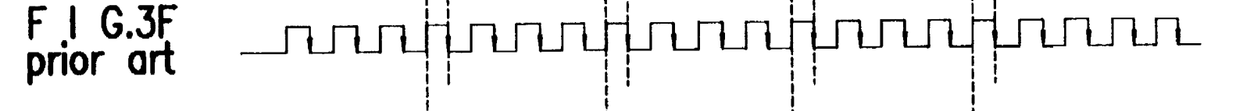
Figure 3G:
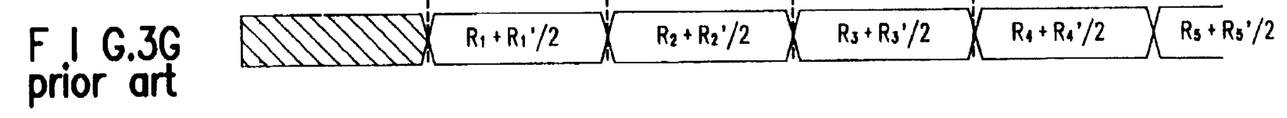

Sequentially, as shown in FIG. 3D, a clock signal is applied to summer 3b so that the output signals of analog/digital converter 2 and 1H delay 3a are summed as shown in FIG. 3E. To ½-fold multiplier 3c, a clock signal of FIG. 3F is applied so that the output signal of 1H delay 3a is multiplied by half as shown in FIG. 3G.

In case a video signal of general NTSC in which the frequency of its main clock signal is about 6.615 MHz is to be frequency-interpolated, the video signal is easy to process because the frequency of the clock signal applied to ½-fold multiplier 3c is about 26.46 MHz. In case of a video signal of VGA2 or VGA3 which has a main clock signal of 13.23 MHz, the frequency of the clock signal applied to ½-fold multiplier 3c is about 81.20 MHz. For a video signal of SVGA which has a main clock signal of 20.3 MHz, the frequency of a clock signal applied to ½-fold multiplier 14 is about 53.04 MHz. In the XGA mode in which the frequency of the main clock signal is 23.72 MHz, a video signal has about 94.88 MHz of the clock signal applied to ½-fold multiplier 14.

For a video signal of EWS mode in which the main clock signal is 27 MHZ, the frequency of a clock signal applied to ½-fold multiplier 14 is about 108 MHz which is too high to interpolate.

Figure 4A:
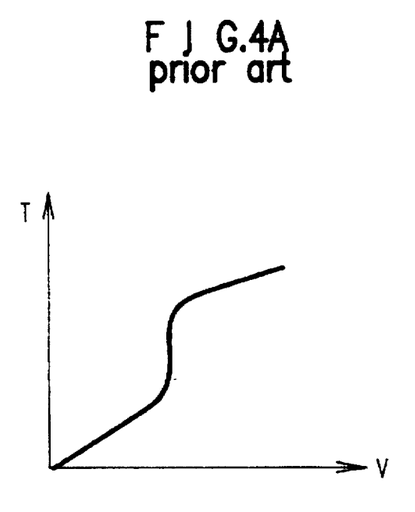
FIG. 4A shows a graph of V-T characteristic of a CPT.
Figure 4B:
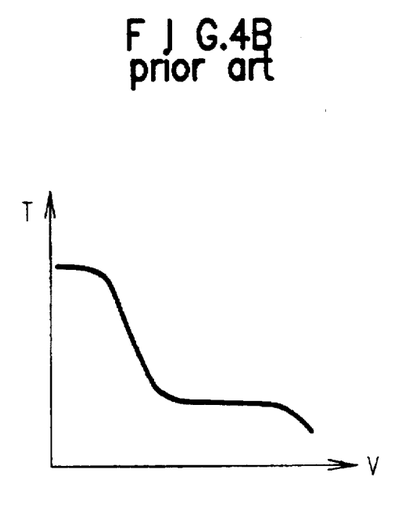
FIG. 4B is a graph of V-T characteristic of LCD.

In addition, the voltage-transmission (V-T) characteristic curves of a color picture tube (CPT) and LCD used as image displays are different from each other. For this reason, the conventional scanning line interpolator performs separate gamma correction in which transmission varies linearly with voltage applied. Specifically, the V-T characteristic curve of CPT varies as shown in FIG. 4A, and LCD's varying as shown in FIG. 4B.

SUMMARY OF THE INVENTION

Therefore, it is an object of the present invention to provide a scanning line interpolator using a gamma correction memory in which the average of a current line digital video signal and a previous line digital video signal is calculated in advance by rounding off, stored in a memory with the current line digital video signal and previous line digital video signal being taken its addresses, and then output according to the digital video signals so that a scanning line is interpolated with a low frequency clock signal, and that, in case of LCD as an image display, gamma corrected data is stored in the memory and output to facilitate gamma correction.

In order to accomplish the object of the present invention, there is provided a scanning line interpolator using a gamma correction memory including a controller for outputting switching control signals according to an input video signal; an analog/digital converter for converting the input video signal into a digital signal; a first multiplexer for allowing the output signal of the analog/digital converter to pass according to the switching control signal output from the controller; a line buffer having a 1H delay for delaying the digital video signal having passed through the first multiplexer; a gamma correction memory for previously storing the scanning line interpolated digital video signal and then outputting it with the output signals of the analog/digital converter and 1H delay being taken as its addresses; and a second multiplexer for selectively outputting the output signals of the analog/digital converter and gamma correction memory according to the switching control signal output from the controller.

DETAILED DESCRIPTION OF THE INVENTION

Hereinafter, a preferred embodiment of the present invention will be described.

A scanning line interpolator using a gamma correction memory comprises a controller for outputting switching control signals $CS_{21}$ and $CS_{22}$ according to an input video signal, an analog/digital converter for converting the input video signal into a digital signal, a line buffer having a multiplexer for allowing the output signal of the analog/digital converter to pass according to switching control signal $CS_{21}$ output from the controller and a 1H delay for delaying the digital video signal having passed through the multiplexer, a gamma correction memory for previously storing the scanning line interpolated digital video signal and then outputting it with the output signals of the analog/digital converter and 1H delay being taken as its addresses $A_{15}-A_0$, and a multiplexer for selectively outputting the output signals of the analog/digital converter and gamma correction memory according to switching control signal $CS_{22}$ output from the controller.

The configuration and operation of the scanning line interpolator using a gamma correction memory of the present invention will be explained below with reference to the attached drawings.

Figure 5:
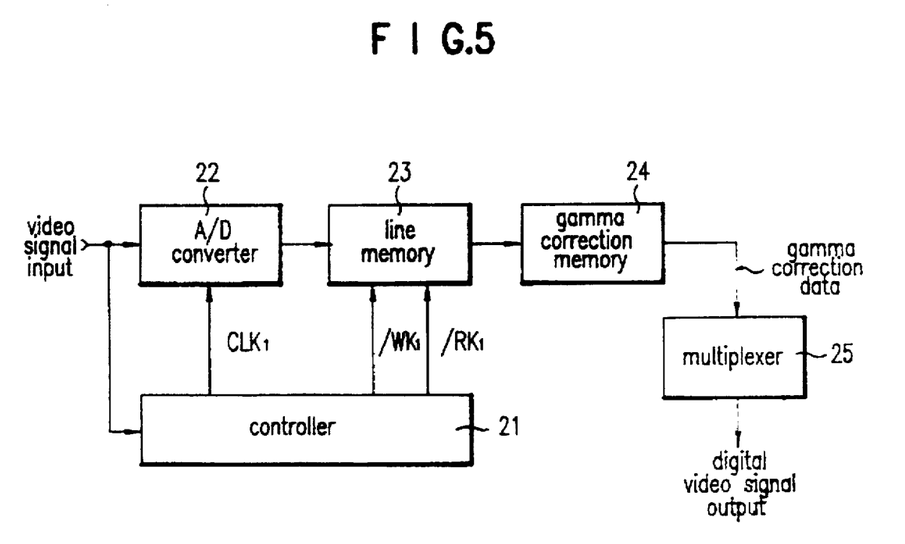
FIG. 5 is a block diagram of a scanning line interpolator using a gamma correction memory of the present invention in case of LCD as an image display.
Figure 7:
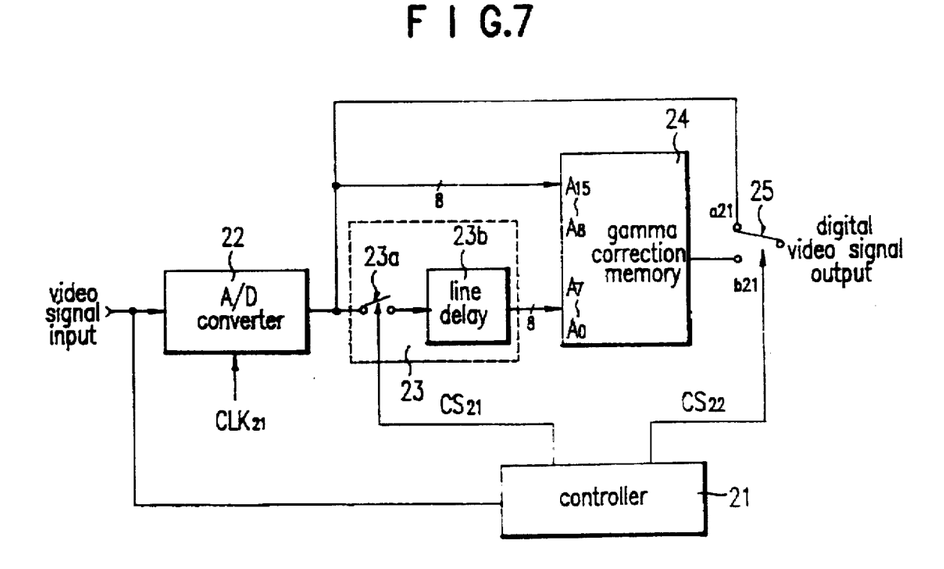
FIG. 7 is a detailed block diagram of FIG. 5.

As shown in FIGS. 5 and 7, the scanning line interpolator using a gamma correction memory of the present invention comprises controller 21 for outputting switching control signals $CS_{21}$ and $CS_{22}$ according to an input video signal, analog/digital converter 22 for converting the input video signal into a digital signal, line buffer 23 having multiplexer 23 for allowing the output signal of analog/digital converter 22 to pass according to switching control signal $CS_{21}$ output from controller 21 and a 1H delay 23b for delaying the digital video signal having passed through multiplexer 23a, gamma correction memory 24 for previously storing the scanning line interpolated digital video signal and then outputting it with the output signals of analog/digital converter 22 and 1H delay 23b being taken as its addresses $A_{15}-A_0$, and multiplexer 25 for selectively outputting the output signals of analog/digital converter 22 and gamma correction memory 24 according to switching control signal $CS_{22}$ output from controller 21.

The operation of the scanning line interpolator using a gamma correction memory of the present invention will be described below.

Figure 8:
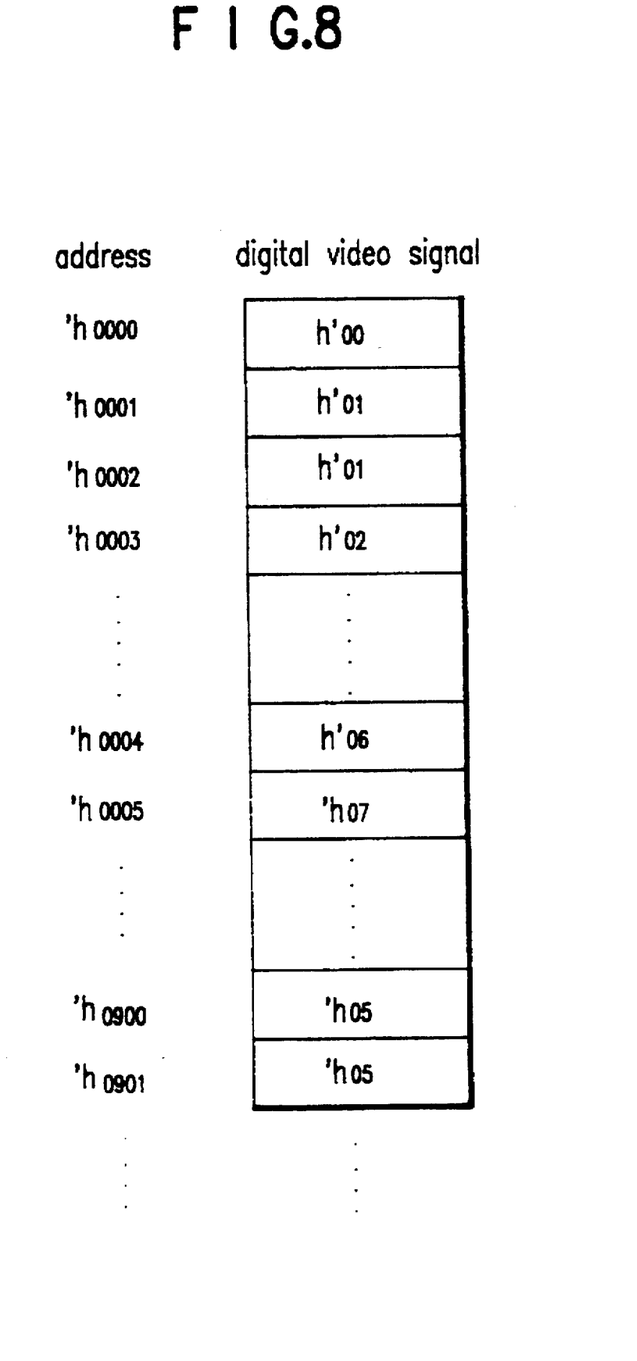
FIG. 8 is a table for digital video signals stored in the memory of FIG. 7.

As shown in FIG. 8, after calculating the average of the output signals of analog/digital converter 22 and 1H delay 23b in advance by rounding off, gamma correction memory 24 stores the result while taking the output signal of 1H delay 23b as lower byte addresses $A_7-A_0$ and the output signal of analog/digital converter 22 as the upper byte addresses $A_{15}-A_8$ of gamma correction memory 24.

Figure 9A:
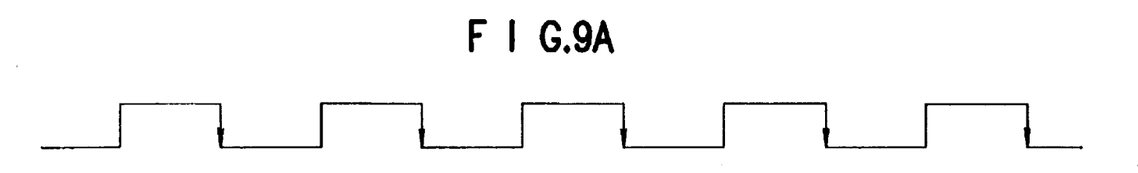
FIGS. 9A–9E show operation waveforms at the respective portions of FIG. 7.
Figure 9B:
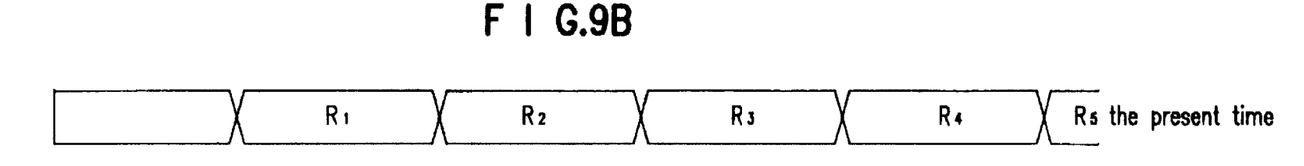
Figure 9C:
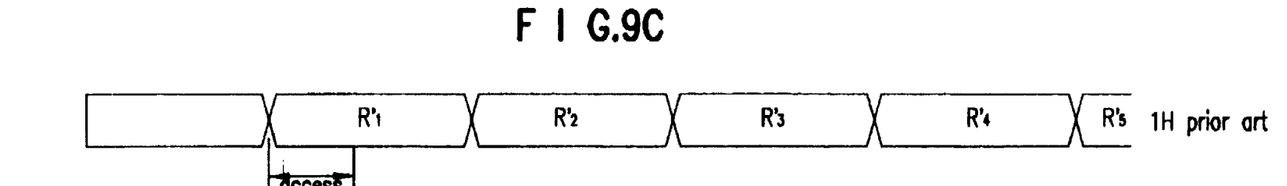

Here, according to the input video signal, controller 21 outputs switching control signals $CS_{21}$ and $CS_{22}$ and applies them to the control ports of multiplexers 23a and 25. Analog/digital converter 22 samples a video signal according to the input clock signal $CLK_{21}$, as shown in FIG. 9A, and converts it into a digital video signal which is then output as shown in FIG. 9B.

Figure 9D:
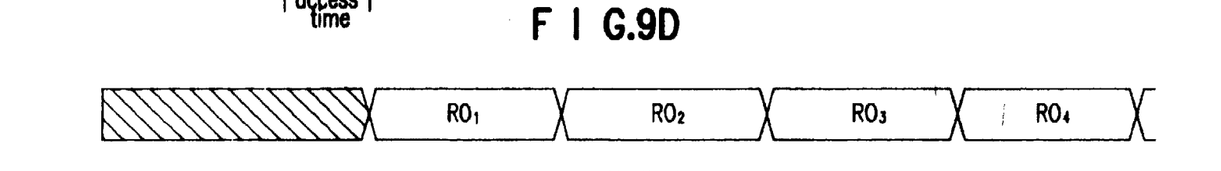

The digital video signal output from analog/digital converter 22 is applied to one fixed port $a_{21}$ of multiplexer 25 and to gamma correction memory 24 as its upper byte addresses $A_{15}-A_8$. The signal is also input to 1H delay 23b through multiplexer 23a according to controller 21, and then applied to gamma correction memory 24 as its lower byte addresses $A_7-A_0$ after delay. Gamma correction memory 24 delays previously stored scanning line interpolated digital data by an access time, as shown in FIG. 9D.

Figure 10A:
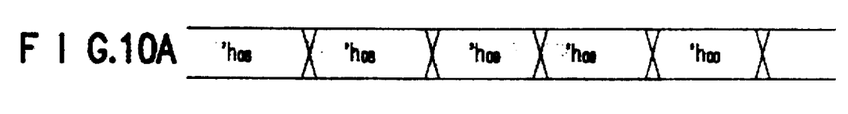
FIGS. 10A, 10B and 10C are waveforms of the digital video signals output from the memory of FIG. 7.
Figure 10B:
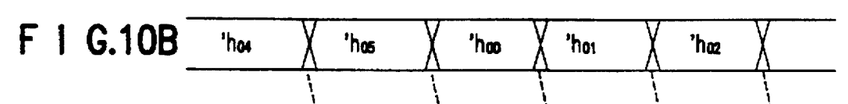
Figure 10C:
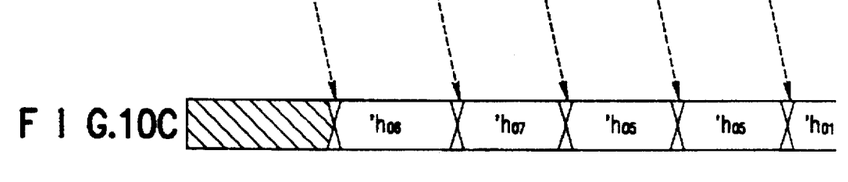

Provided that analog/digital converter 22 outputs a current line digital video signal as shown in FIG. 10A and that 1H delay 23b outputs 1H preceding line digital video signal as shown in FIG. 10B, gamma correction memory 24 outputs a digital video signal of the average obtained by calculating the two digital video signals by rounding off, as shown in FIG. 10C.

Figure 9E:
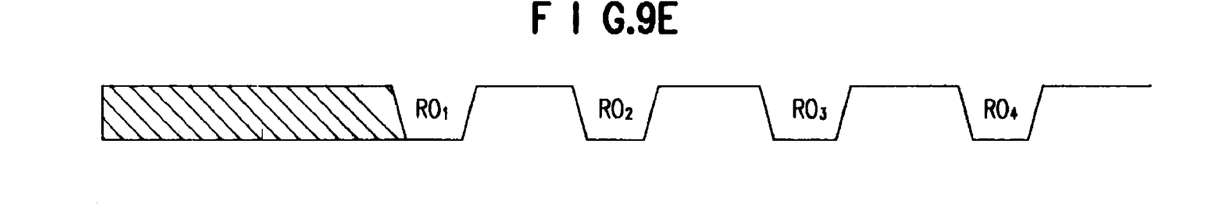

The digital video signal output from gamma correction memory 24 is applied to the other fixed port $b_{21}$ of multiplexer 25, which is switched by control signal $CS_{22}$ output from controller 21 as shown in FIG. 9E so that the output signals of analog/digital converter 22 and gamma correction memory 24 are selectively output for scanning line interpolation.

Specifically, if control signal $CS_{22}$ is HIGH potential, multiplexer 25 selects the output signal of analog/digital converter 22. If control signal $CS_{22}$ is LOW, the output signal of gamma correction memory 24 is selected for scanning line interpolation.

Figure 6:
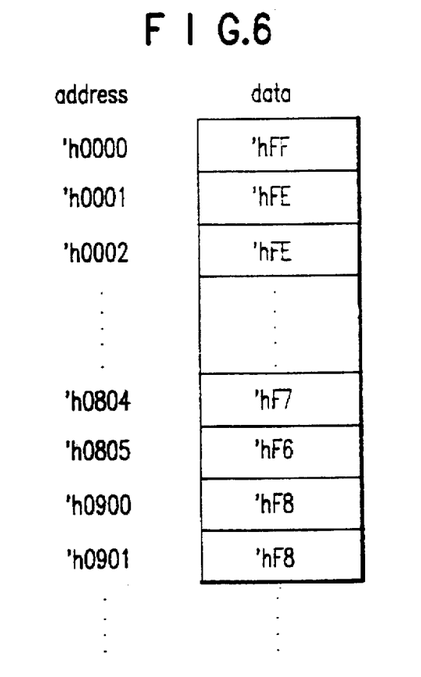
FIG. 6 is a table for gamma corrected data stored in the gamma correction memory of FIG. 5.

The above-discussed case is embodied with a CPT used as its image display. If an LCD is used for the image display, gamma correction data is previously stored in gamma correction memory 24 as shown in FIG. 6, and a gamma corrected digital video signal is output with the output signals of analog/digital converter 22 and 1H delay 23b being taken as addresses $A_{15}$–$A_0$.

As described above, in the present invention, the average of the current and preceding line video signals is stored and output for scanning line interpolation while they are taken as addresses. For this reason, high resolution is obtained and a low frequency clock may be used which facilitates its processing. In case of LCD as the image display, it is sufficient that gamma corrected data is stored in the memory. This simplifies the configuration of the circuit.

What is claimed is:

1. A scanning line interpolator using a gamma correction memory comprising:

a controller for outputting switching control signals according to an input video signal;

an analog/digital converter for converting the input video signal into a digital signal;

a first multiplexer for allowing the output signal of said analog/digital converter to pass according to said switching control signal output from said controller;

a line buffer having a 1H delay for delaying the digital video signal having passed through said first multiplexer;

a gamma correction memory for previously storing the scanning line interpolated digital video signal and then outputting it with the output signals of said analog/digital converter and 1H delay being taken as its addresses; and a second multiplexer for selectively outputting the output signals of said analog/digital converter and gamma correction memory according to said switching control signal output from said controller;

wherein said gamma correction memory calculates the average of the output signal of said analog/digital converter and 1H delay in advance by rounding off, and said average is stored and output while taking the output signal of said analog/digital converter as the upper byte addresses and the output signal of said 1H delay as lower byte addresses.

2. A scanning line interpolator using a gamma correction memory as claimed in claim 1, wherein said gamma correction memory previously stores gamma correction data, and outputs it with the output signals of said analog/digital converter and 1H delay being addresses.

* * * * *